Patented May 15, 1923.

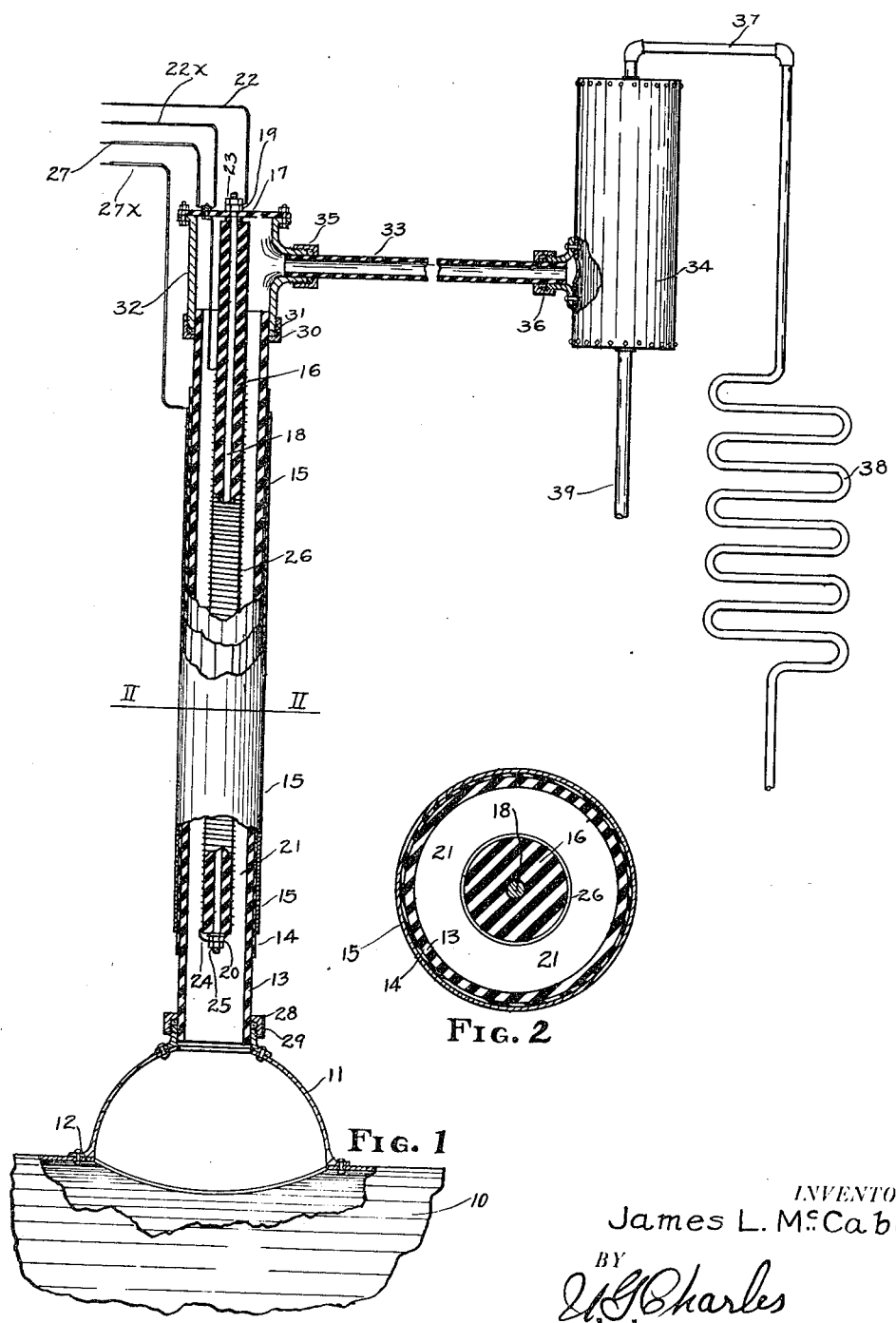

1,455,088

UNITED STATES PATENT OFFICE.

JAMES L. McCABE, OF WICHITA, KANSAS.

ELECTRICALLY-OPERATING TREATING CHAMBER FOR HYDROCARBON VAPORS AND GASES.

Application filed February 3, 1922. Serial No. 533,904.

*To all whom it may concern:*

Be it known that I, JAMES L. McCABE, a citizen of the United States, and a resident of Wichita, in the county of Sedgwick and State of Kansas, have invented certain new and useful Improvements in an Electrically-Operating Treating Chamber for Hydrocarbon Vapors and Gases, of which the following is a description, referring to the accompanying drawings, which form a part of this specification.

The invention relates to an improvement in treating chambers, electrically operating, and in combination with a still and condenser for treating hydrocarbon oil vapors as mixed with hydrocarbon gases or gases containing hydrogen for the purpose of securing a resultant hydrocarbon liquid having the requisite properties essential as a fuel in combustion engines and the like. Specific improvements and advantages of the present invention will be further described throughout the specification and as referred to in the drawings, in which Fig. 1 is a side elevation of the treating chamber showing its relationship to the still, fractionation tower and condenser in the combined apparatus, with parts in section for clearness of illustration. Fig 2 represents a sectional view taken along the line II—II, in Fig. 1. Similar numerals of reference indicate corresponding parts throughout the drawings.

Referring to the drawings, 10 represents the upper portion of any preferred form of still and within which hydrocarbon oils are to be considered introduced and under heat action as applied to said still in any preferred manner, hydrocarbon vapors are given off; in the preferred process, hydrocarbon gases or gases containing hydrogen are introduced into the still and mixed with the hydrocarbon vapors and so that such mixture enters the treating chamber and during upward travel are subjected to certain electrical actions as later explained.

The treating chamber includes an inverted conical funnel-like member 11 rigid with and carried above the still 10 as at 12 and supporting the treating chamber wall 13, preferably formed of pyrex glass tubing or any other nonconducting material. Enveloping this tube 13 is seen an insulating covering 14 as such as mica whose dielectric strength will not break down under the heat adjacent thereto and enveloping the covering 14 is a metallic substance 15 as a cold electrode.

Vertically arranged within the walls 13 is seen an insulating element 16 such as will withstand high heats and not readily absorb oils. The element 16 is supported from the insulated cap 17 sealing the upper portion of the chamber. A rod or pipe 18 is axially aligned within the element 16 and provided with top and bottom nuts 19, 20 rigidly holds and maintains the element 16 in the vertical or lengthwise axis of the treating chamber or so that a space 21 is provided around the element 16 within the walls 13 for the passage of the vapor and gaseous mixtures.

The alternating electric heating current connects the terminal of one of its wires 22 to the rod 18 by means of the nut 23. At the lower end of the rod 18 an electric connection 24 secured thereto by the nut 25 leads to the wire element or coil in the heating circuit as at 26 and which connects to the terminal of the other wire $22^x$ in said heating circuit.

The high potential currents connect through the wires 27 and $27^x$ which connect respectively to the heating coil 26 as the hot electrode and to the cold electrode 15. It will be noted that the electrode 15 is shorter than the wall 13 or so that the ends of the electrode 15 are arranged thereupon at a distance from the metallic bushing cap 28 covering the packing 29 at the union with the member 11; and also at a distance from the similar metallic bushing cap 30 covering the packing 31 at the base of the metallic top cap fitting 32, which is capped by the insulating cap 17. Thus electro thermionic emissions or discharges occur during operation of the device between the electrodes 26 and 15 so as to pack the space 21 with such emissions and discharges and so that the vapors in passing through the passage 21 and heated by the axially and centrally aligned heating element 26 to such degrees as may be proved desirable receive the aforementioned electro-thermionic emissions and discharges and which accomplish the preferred treatment of the vapor-gas mixture.

The amperage required will vary according to the length of the heating element 26 which should be heated to about a cherry red heat, it likewise depends upon the grade and kind of material used in the element. The voltage required should be just sufficient to puncture the gap 21, if more voltage is employed it would be wasted. It is evident from the foregoing that the exact voltages and amperages required in varied installations will vary and I do not desire to restrict the broad conception of the invention to any specified amounts.

From the fitting 32 leads the pyrex tubing 33, or other non-conducting material; at 34 is seen the fractionation tower, the bushing nuts and packings 35, 36 providing tight connections as will be understood. From the tower the pipe 37 conducts the treated vaporous mixture to the condenser 38 and from which the desired hydrocarbon liquid is then obtained.

Certain hydrocarbon elements reach the fractionation tower untreated and these pass by gravity from the tower 34 through the pipe 39, which connects to the still 10, the connection however not being shown in the drawing. Thus a means is afforded in my apparatus of caring for untreated elements or reworking same through the treating chamber.

It is evident from the foregoing disclosure that varied temperatures can be secured and applied from the center of the passing vapor-gas mixture; and develop such a packing for the electro-thermionic discharges and emissions that substantially every element of the mixture will receive a like treatment.

Such modifications may be employed as lie within the scope of the appended claims.

Having fully described my invention what I now claim as new and desire to secure by Letters Patent is;

1. In an apparatus for treating hydrocarbon oils, vapors and gaseous mixtures; a tubular treating chamber having walls of a non-electric conducting material, an insulating element axially arranged within the treating chamber and surrounded by a space intermediate the walls thereof; a heating coil arranged on said element and in an electric circuit, said coil also serving as an electrode of another circuit and an insulated electrode of the other circuit enveloping the treating chamber.

2. In an apparatus for treating hydrocarbon oils, vapors and gaseous mixtures; a tubular treating chamber, an insulating element axially arranged within the treating chamber, a passage surrounding said element and a heating coil in an electric circuit arranged on said element and serving as an electrode of another circuit, the walls of said chamber being of a non-electric-conducting material and an electrode of the other circuit enveloping a portion of said walls.

3. In an apparatus for treating hydrocarbon oils, vapors, and gaseous mixtures; a cylindrical treating chamber having walls of a non-electric conducting material, an intake opening at one end of said chamber and a cap member at the other end of said chamber, a port leading from said cap member; an insulating element depending from said cap member, and arranged in the longitudinal axis of said chamber with a cylindrical passageway surrounding said element and connecting the intake and port of said chamber; a coil enveloping said element and in an electric heating circuit; a second electric circuit, said coil serving as one electrode of said last mentioned circuit and an electrode enveloping a portion of the walls of said chamber and also in the last mentioned circuit.

4. In an apparatus for treating hydrocarbon oils, vapors and gaseous mixtures; a still, a treating chamber leading from said still, a fractionation tower, a connection between said tower and the outer portion of said chamber and a condenser connecting to said tower; the wall elements of said chamber comprising a non-electric conducting material, an insulating covering contiguous to outer portions thereof and a metallic electrode surrounding same; an insulating element axially arranged within said chamber, a passage surrounding said element; a heating coil in an electric circuit arranged on said element, said coil serving as an electrode in a second circuit in which is included the first mentioned electrode.

JAMES L. McCABE.